Dec. 7, 1954 E. J. MAUST 2,696,300
DRUM SEPARATOR
Filed Feb. 23, 1951 2 Sheets-Sheet 1
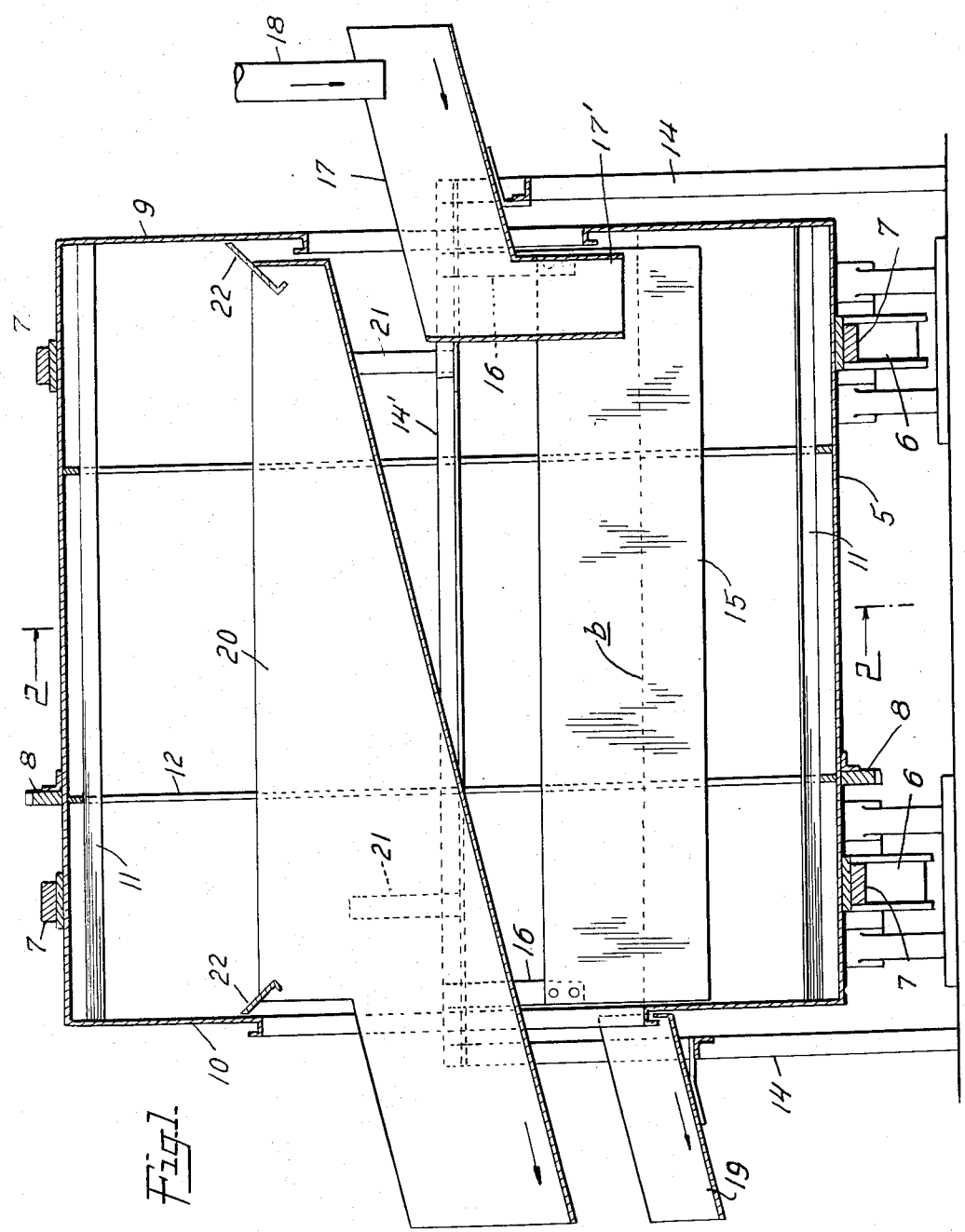
INVENTOR
ERNEST J. MAUST
BY
Pennie, Edmonds, Morton, Barrows and Taylor
ATTORNEYS Dec. 7, 1954     E. J. MAUST     2,696,300
DRUM SEPARATOR
Filed Feb. 23, 1951     2 Sheets-Sheet 2
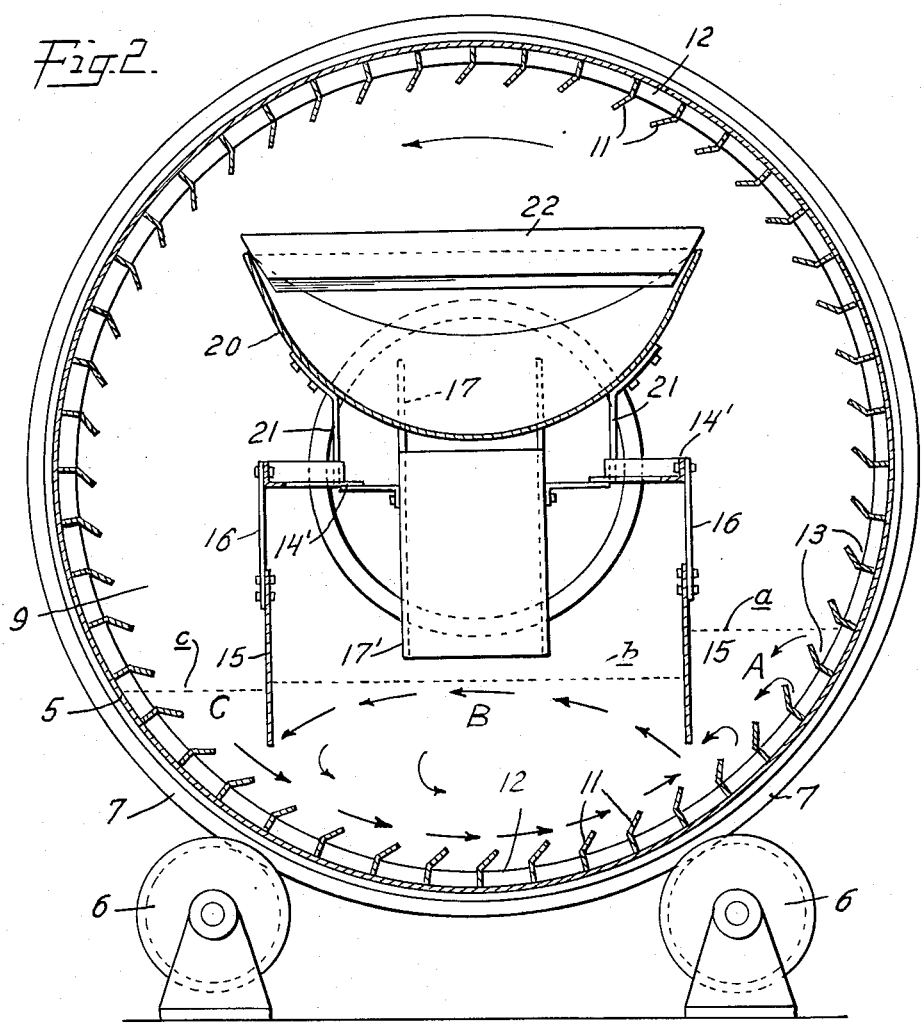
INVENTOR
ERNEST J. MAUST
BY
ATTORNEYS

United States Patent Office 2,696,300
Patented Dec. 7, 1954

2,696,300

DRUM SEPARATOR

Ernest J. Maust, Packanack Lake, N. J., assignor to Western Machinery Company, New York, N. Y., a corporation of Utah Application February 23, 1951, Serial No. 212,249

3 Claims. (Cl. 209—172.5)

This invention relates to the separation by gravity of solid particles of different specific gravities in a "heavy" or "dense" liquid or medium, and has for its object the provision of certain improvements in a drum type separator for effecting the contemplated separation.

The heavy media separation process, sometimes called the sink and float process, consists in introducing a mixture of the solid particles of different specific gravities to be separated, such for example as a crushed ore agglomerate, into a heavy (dense) liquid or medium of a specific gravity between the specific gravities of the solid particles (e. g. valuable and waste constituents of the crushed mineral agglomerate) to be separated. The solid particles having a specific gravity less than that of the heavy medium float to the surface, while the solid particles having a specific gravity greater than that of the heavy medium sink in the medium. Usually, the heavy medium is an aqueous suspension of a finely divided solid, such, for example, as finely ground galena, barytes, silica, hematite, magnetite, ferrosilicon and mixtures of one or more of these with other minerals.

Cone separators have heretofore been commonly used for carrying out the heavy media separation process. While separators of the drum type are known and have been used in a small way, they have given in practice very indifferent results, and have attained no favor in the art. I have discovered that remarkably improved results are obtained when the lifting vanes (commonly called sink lifters) are solid rather than perforated as has heretofore been the case. Accordingly, the invention is characterized in that the sink lifters are solid and have a substantial portion thereof inclined in the direction of rotation of the drum thereby forming an imperforate pocket for settled solid particles and medium between the lifter and the adjacent inner surface of the drum. As the drum rotates, the imperforate pockets formed by the solid lifters continuously move a very large volume of medium from off the bottom of the pool of medium in the drum and return it to the pool behind the customary baffle or skirt board, but beneath the surface of the pool. Consequently, a continuous agitation of the medium takes place beneath the surface of the pool sufficient to maintain the suspension in the medium of its finely divided solid constituent without any mechanical disturbance of the pool and with no substantial disturbance at the surface of the pool.

The invention will be best understood from the following description taken in conjunction with the accompanying drawings, in which:

Fig. 1 is a sectional side elevation of a drum separator embodying the invention, and Fig. 2 is a cross section of the separator taken on the section line 2—2 of Fig. 1.

The separator comprises a hollow cylindrical drum 5, advantageously made of welded, rolled steel plate, which is supported for rotation on four rollers 6 mounted on the foundation, and riding on two steel tires 7 fixed to the outside of the drum near each end. The drum is rotated by a sprocket 8 (fixed to the outside) and a cooperating driving means (not shown). The ends of the drum are partially closed by annular plates 9 and 10, with their circular openings in the axis of the drum. The circular opening of the plate 10 constitutes in effect an overflow wier for the float fraction of the separation, and is of larger diameter than the circular opening of the plate 9.

A multiplicity of longitudinal sink lifters 11 are secured in circumferentially spaced relation to the inside surface of the drum. The lifters, of solid (imperforate) steel plate or the like, are bolted or welded to diaphragm flanges 12 welded to the inside surface of the drum. A substantial portion of each lifter is inclined (with respect to the radial axis) in the direction of rotation of the drum, indicated by the arrow near the top of Fig. 2. Preferably, about half of the outer free portion of the lifter is so inclined, at about an angle of 45° with respect to the radial axis, while the inner portion (attached to flange 12) of the lifter is radially positioned, thereby providing a longitudinal imperforate pocket 13 between the lifter and the adjacent inner surface of the drum. The lifters are uniformly spaced a few inches apart (e. g. 3 to 8 inches) around the entire inner surface of the drum, and extend inwardly a few inches (e. g. 5 to 10 inches) from the inner surface of the drum. In a drum about 10 feet long and 10 feet in diameter, the lifters may advantageously be spaced about 7 inches apart, and the inner edge of the lifter may be about 7 inches (radially) from the inside surface of the drum.

A structural steel frame 14 is mounted on the foundation, at each end of the drum, and its horizontal members 14' extend through the circular openings of the end plates 9 and 10 and provide support for the stationary members within the drum. A longitudinal partition or baffle (skirt board) 15 is vertically mounted within the drum on each side of the center longitudinal axis about midway between the axis and the adjacent inner surface of the drum. The partitions 15 are secured to the member 14' of the frame by straps 16, with the lower edge of each partition about twice the distance (radially) from the inside surface of the drum as the tips or inner edges of the lifters 11. Thus, in the aforementioned 10-foot drum, the lower edge of each partition is about 14 inches (radially) from the inside surface of the drum, and hence about 7 inches from the tips of the lifters 11 as the latter pass beneath the partitions.

A feed chute 17 (for the mixture of solid particles to be separated) is mounted on the frame 14 and extends through the circular opening of the end plate 9 into the drum, its depending discharge end 17' being proximate the end (9) of the drum and terminating just below the normal liquid level of the pool of heavy medium within the drum.

Heavy medium (of selected specific gravity) is supplied to the drum by means of a pipe 18, and intimately mixes with the feed in feed chute 17. Heavy medium, with the light or float fraction of the separation, overflows through the circular opening of the end plate 10 into a discharge launder 19. A discharge trough 20 for the heavy or sink fraction of the separation extends longitudinally through the drum, for the most part above the central axis of the drum and below the point where the lifters 11 pass the pocket-discharge position in their revolution. The trough is appropriately secured to the frame 14 by straps 21. The top of the trough is provided with end chutes 22, suitably attached to the ends of the trough, for guiding into the trough such solid particles as might otherwise drop from the lifters 11 into the space between the ends of the rotating drum and the adjacent ends of the stationary trough.

In the operation of the separator, the drum is slowly rotated, e. g. at about 2 R. P. M. in the case of the aforementioned 10-foot drum. The feed (along with fresh heavy medium) is introduced through the chute 17 at one end of the drum and is submerged in the pool of heavy medium in the separating compartment B between the partitions 15. The float fraction rises to the surface and overflows from the drum into the discharge launder 19. The heavy fraction sinks to the bottom of the drum, is picked up by the lifters 11, carried to near the top of the drum, and dropped into the discharge trough 20.

In accordance with the invention, the vanes of the lifters 11 are solid and act not only to convey the heavy or sink fraction of the separation out of the pool of medium and thence into the discharge trough 20, but also act to circulate the medium beneath the surface or liquid level of the pool. This circulation of the medium beneath the surface of the pool prevents segregation of the finely divided solid constituent of the medium and eliminates the necessity of introducing medium under pressure, and the rising velocity associated with the extraneous circulation of the medium as heretofore commonly practiced in the art. This positive circulation of the medium beneath the pool level allows the surface of the pool to be entirely quiescent, thus providing a pool having the characteristics of the heavy media used in laboratory practice, giving separating efficiencies superior to other apparatus where rising currents or agitating devices are employed to maintain suspension in the medium of its finely divided solid constituent.

As the solid or imperforate lifters move upwardly from the bottom of the drum, they bodily move some medium from the bottom of the pool and return a substantial part of it to the pool behind (on the right side in Fig. 2) the baffle or skirt board 15, but beneath the surface of the pool, and induce within the pool a positive and effective circulation of medium, so that the finely divided solid constituent thereof is maintained in suspension and only such amount of medium need be supplied to the drum as overflows with the float fraction of the separation. Contrasted with the operation of such separators as the cone, the volume of medium that need be circulated is reduced to less than one-half. This reduces the power and maintenance in the plant to a large extent, and is a distinct improvement in the art.

The solid lifters thus induce a gentle, controlled agitation of the heavy medium in the drum as a result of the passage of the lifters through the medium as the drum rotates. The arrows at the bottom of Fig. 2 indicate generally the nature of this agitation. The rising lifters carry the liquid level to a slightly higher level (a) in the longitudinal compartment A between the partition 15 and the rising lifters than the level (b) in the main separating compartment B between the partitions. Also, the lifters moving through the medium bring the liquid level (c) in the longitudinal compartment C between the partition 15 and the descending lifters to a lower level than in the compartment B. Thus, there is a gentle flow of medium from the compartments A and C beneath the partitions 15 into the compartment B. This flow of medium into compartment B sets up a gentle circulation of the medium in this compartment where separation of the float and sink fractions mainly takes place. The continuous circulation of the heavy medium minimizes segregation of its finely divided solid constituent, and provides an effective mixing of the medium with the solid particles to be separated without substantial disturbance at the surface, and solids, tending to settle near the bottom of the drum, are continuously moved upwardly and a cleaner and more effective separation is thereby attained. The clearance between the lower edge of the partitions 15 and the tips of the lifters 11 determines the velocity of the flow of medium between the compartment A (and C) and B, and the speed of rotation of the drum, the radial width of the lifters and their circumferential spacing determine the volume of such flow. With a drum and lifters of given dimensions, the slower the drum rotates the more closely should the lifters be spaced, to provide the contemplated volume of liquid flow from compartments A—C to compartment B. In the case of the aforementioned 10-foot drum with lifters of the dimensions hereinbefore specified and a drum speed of 2 R. P. M., the volume of liquid flow between compartments A and B is of the order of 2000 gallons per minute. With an overflow depth of 4 inches at the center of the circular opening in the end plate 10, there is practically no disturbance at the surface of the pool within compartment B of the drum, and the specific gravity differential between the fresh medium supplied to the drum and the medium associated with the float overflow is only about 0.04.

I claim:

1. In a separator of the rotary drum type for separating solid particles of different specific gravities by the heavy media process including a rotatable drum having imperforate cylindrical side and annular end walls, each of the imperforate annular end walls being provided with a substantially circular central opening, means for introducing heavy medium and solid particles to be separated into the drum through the opening in one of said end walls, means for discharging floating solid particles from the drum through the opening in the other of said end walls, and a multiplicity of sink lifters circumferentially spaced about and secured to the inner surface of the drum and adapted as the drum rotates to carry settled solid particles out of the medium to a discharge trough therefor, the improvement characterized by the provision of a longitudinally disposed stationary baffle vertically positioned within the drum on each side of its center axis and between the axis and the adjacent inner surface of the drum with the lower edge of each baffle spaced from the inner surface of the drum, and further characterized in that the sink lifters are solid and have a substantial portion thereof inclined in the direction of rotation of the drum and form with the inner surface of the drum a multiplicity of circumferentially spaced imperforate pockets.

2. In a separator of the rotary drum type for separating solid particles of different specific gravities by the heavy media separation process including a rotatable drum having imperforate cylindrical side and annular end walls, each of the imperforate annular end walls being provided with a substantially circular central opening, means for introducing heavy medium and solid particles to be separated into the drum through the opening in one of said end walls, means for discharging floating solid particles from the drum through the opening in the other of said end walls, and a multiplicity of sink lifters circumferentially spaced about and secured to the inside surface of the drum and adapted as the drum rotates to carry settled solid particles out of the medium to a discharge trough therefor, the improvement characterized by the provision of a longitudinally disposed stationary baffle vertically positioned within the drum on each side of its center axis and between the axis and the adjacent inner surface of the drum with the lower edge of each baffle spaced from the inner surface of the drum, and further characterized in that the sink lifters are longitudinally secured to the inside surface of the drum at intervals of from 3 to 8 inches apart and each comprises a solid vane having an inner portion radially positioned with respect to the axis of the drum and an outer portion inclined in the direction of rotation of the drum thereby forming an imperforate longitudinal pocket along the inside of the drum.

3. The improvement according to claim 2 further characterized in that the lower edge of each baffle is radially spaced from the adjacent inner surface of the drum by about twice the distance that the inner tips of the sink lifters are radially spaced from the inner surface of the drum.

References Cited in the file of this patent

UNITED STATES PATENTS

| Number | Name | Date |
|--------|------|------|
| 1,839,804 | Perkins | Jan. 5, 1932 |
| 2,479,141 | Smith | Aug. 16, 1949 |
| 2,482,747 | Davis et al. | Sept. 27, 1949 |
| 2,521,152 | Davis | Sept. 5, 1950 |
| 2,624,461 | Falconer | Jan. 6, 1953 |